United States Patent [19]

Conner et al.

[11] Patent Number: 5,008,021

[45] Date of Patent: Apr. 16, 1991

[54] IN-SITU FORMATION OF SOLUBLE SILICATES FROM BIOGENETIC SILICA IN CHEMICAL FIXATION/SOLIDIFICATION TREATMENT OF WASTES

[75] Inventors: Jesse R. Conner, Darien, Ill.; Roy S. Rieber, Houston, Tex.

[73] Assignee: enviroGuard, Inc., Houston, Tex.

[21] Appl. No.: 470,815

[22] Filed: Jan. 26, 1990

Related U.S. Application Data

[63] Continuation-in-part of Ser. No. 224,857, Jul. 27, 1988, abandoned.

[30] Foreign Application Priority Data

Jul. 28, 1987 [GB] United Kingdom ............... 8717860

[51] Int. Cl.$^5$ ........................... C02F 1/68; C02F 11/14
[52] U.S. Cl. ..................................... 210/751; 210/747; 106/624; 501/155
[58] Field of Search .................... 210/747, 751, 170; 405/128, 129; 106/624; 501/155; 423/DIG. 20

[56] References Cited

U.S. PATENT DOCUMENTS

| | | | |
|---|---|---|---|
| 3,837,872 | 9/1974 | Conner | 106/74 |
| 3,841,102 | 10/1974 | Cinner | 210/751 |
| 3,959,007 | 5/1976 | Pitt | 106/406 |
| 4,105,459 | 8/1978 | Mehta | 106/98 |
| 4,432,666 | 2/1984 | Frey | 210/751 |
| 4,460,292 | 7/1984 | Durham | 405/129 |
| 4,488,908 | 12/1984 | Goodwin | 106/75 |
| 4,571,389 | 2/1986 | Goodwin | 501/85 |
| 4,600,514 | 7/1986 | Conner | 210/751 |
| 4,619,911 | 10/1986 | Goodwin | 252/62 |
| 4,623,469 | 11/1986 | Conner | 210/751 |
| 4,726,710 | 2/1988 | Rosar | 210/751 |

*Primary Examiner*—Ernest G. Therkorn
*Attorney, Agent, or Firm*—James F. Weiler

[57] ABSTRACT

Disclosed is the solidification and chemical fixation of wastes using biogenetic primarily amorphous silica to the waste at ambient temperature and pressure in the presence of a strong alkali and sufficient water in the waste which converts the biogenetic silica into a soluble silicate and sufficient water to form the soluble silicate, and in the presence of a polyvalent metal ion in the waste which reacts with the formed soluble silicate to provide a cementitious product of the waste. In the event there is insufficient strong alkali or water present in the waste to convert the biogenetic amorphous silica to a soluble silicate, and insufficient polyvalent metal ion in the waste to harden and form a cementitious product, amounts of these components as necessary can be added along with the biogenetic silica to the waste. The resulting cementitious and chemically fixed waste can be left in place, for example to provide a land farm, or can be removed and broken up and used as a cover for land fills, various land applications, and farms, as well as other applications.

14 Claims, No Drawings

IN-SITU FORMATION OF SOLUBLE SILICATES FROM BIOGENETIC SILICA IN CHEMICAL FIXATION/SOLIDIFICATION TREATMENT OF WASTES

RELATED APPLICATION

The present application is a continuation-in-part of U.S. application Ser. No. 224,857 filed July 27, 1988, abandoned in favor of this application.

The present invention relates to a solidification and chemical fixation treatment of wastes using as an additive therein biogenetic amorphous silica in the presence of a strong alkali and a polyvalent metal ion.

BACKGROUND OF THE INVENTION

Soluble silicates combined with various setting agents have been used in the chemical fixation and solidification (CFS) field since the 1960's. Perhaps the most notable patent in this area is U.S. Pat. No. 3,837,872 owned by Chemfix Technologies Inc. although there is a great deal of other very similar prior art. A good review of prior art techniques is given in U.S. Pat. No. 4,600,514. None of the prior art, however, teaches the in situ formation of soluble silicates from solidification additives and/or wastes. One major drawback to the Portland cement/soluble silicate process has been that the reaction is often so rapid that control is difficult especially in batch treatment systems. For this reason, the process has been used primarily in large scale, continuous flow applications. Another disadvantage is that the additives, i.e. a solid (usually Portland cement) and a liquid (usually a 38% solution of $3.22SiO_2:Na_2O$ sodium silicate), must be separately stored and added to the waste with very rapid and complete mixing. These problems were addressed in two patents, U.S. Pat. No. 4,518,508 and 4,600,514, assigned to SolidTek Systems Inc. and Chem-Technics, Inc., respectively. In these inventions, solid soluble silicates were substituted wholly or partially for the liquid solution using other means to increase the viscosity of low-solids wastes so that phase separation would not occur while the mixture hardened in a slower and more controlled manner.

Much use has been made of soluble silicates in CFS technology to fix toxic metals in less soluble forms that will meet RCRA standards for leachability. However, when the metals are already speciated as partially soluble compounds, such as hydroxides, the silicates do little other than to reduce access of the leachant to the metals by physical means. The reason for this is that the silicate is quickly used up by its reactions with the setting agent (Portland cement, etc.) and/or the waste, and is not available later as the metal compounds slowly dissolve.

SUMMARY OF THE INVENTION

The present invention is based on the discovery that biogenetic amorphous silica when added to waste at ambient temperature and pressure is converted by a strong alkali to give a soluble silicate which then reacts with polyvalent metal ions to give a cementitious product. The waste may be liquid or dry, it only being necessary that sufficient water be present to form soluble silicates.

Accordingly, the present invention provides a method of treating waste material under ambient temperatures and pressures with biogenetic amorphous silica in the presence of a strong alkali and sufficient water to convert the biogenetic silica to a soluble silicate which forms in the presence of polyvalent metal ions a cementitious product with the waste material. In some wastes the strong alkali and the polyvalent metal ions are present and, if not present or insufficient amounts are not present, either or both of these components can be added to the waste along with the biogenetic silica. If sufficient water is not present for the reactions to occur, water can be added, the amount of which can be determined by simple experiment.

Because of its availability and high porosity, rice hull ash from energy producing burning of rice hulls is currently preferred.

The term "in situ" solidification and chemical fixation of wastes as used herein means the addition of the biogenetic silica or the addition of the biogenetic silica and one or more of the strong alkali of the order of about pH 12 and higher, one or more polyvalent metal ions and water as needed to the waste so that the soluble silicate is formed in the waste and then the waste is solidified and chemically fixed by polyvalent metal ions in the waste.

The present invention thus provides an excellent means of overcoming the above-mentioned disadvantages of the prior art methods of fixing toxic metals since, in the method of the present invention, the soluble silicate is formed slowly with the waste and probably continues to form for a very long time so that it is continuously available for reaction with the toxic metal ions as they are formed. Also, because of the alkalinity, respeciation of the toxic metal compounds may be accelerated in the system of the present invention.

Accordingly, it is an object of the present invention to provide a method of solidification and chemical fixation of a waste by adding to the waste at ambient temperatures and pressures biogenetic silica in substantially amorphous state in the presence of a strong alkali and water sufficient to form a soluble silicate with the waste, and in the presence of a polyvalent metal ion sufficient to form a cementitious product with the soluble silicate effective to solidify and chemically fix the liquid waste.

A further object of the present invention is the provision of such a method in which the biogenetic silica is rice hull ash, such as obtained in the commercial energy burning of rice hulls.

A further object of the present invention is the provision of such methods in which the biogenetic silica is added to the waste and such amounts of a strong alkali and a polyvalent metal ion as necessary are added to the waste.

It is a further object of the present invention to provide such a method in which the soluble silicate is formed slowly and continues to form for a very long period of time so that it is continuously available for reaction with toxic metal ions as they are formed in the waste.

It is a further object of the present invention to provide a process of solidification and chemical fixation of waste at ambient temperatures and pressures, in which the set time is controllable, which results in better mechanical properties due to high solid content, which has immediate solid formation due to the sorptive powers of biogenetic silica, such as rice hull ash, which has improved mixability of the ingredients with high viscosity sticky waste, which possess economic advantages, especially when the alkali and/or the polyvalent metal ion are present in the waste, in which an all solids reagent system, premixed if desired, can be used in which a variety of setting agents can be used, in which the pH of the resulting solid can be controlled, and in which the metals are chemically fixed, especially on a long-term basis.

It is a further object of the present invention to provide a method to solidify and chemically fix wastes in which the resulting waste product is valuable and can be broken up and used as a cover for land fills, land applications and farms, as well as other applications.

Other and further objects, features, and advantages will appear to those skilled in the various art to which the invention is directed, some of which are mentioned herein.

DESCRIPTION OF PREFERRED EMBODIMENTS

The present invention, as mentioned above, is directed to solidification treatment of wastes by adding to them biogenetic amorphous silica, such as ash from rice hulls (RHA), rice stalks, equisetum (horse tail weed), bagasse, and certain bamboo palm leaves, particularly palmyra pollen and the like. The biogenetic silica is obtained by controlled burning of the biogenetic source material to produce silica in which substantially all of the silica is in an amorphous state. Reference is made to U.S. Pat. No. 4,460,292 for a description of a commercial energy burn of biogenetic materials, such as rice hulls, to obtain biogenetic silica. Preferably, the biogenetic silica is in amorphous state, although some crystalline silica may be present as well as residual carbon, trace minerals and organic material.

The waste can be liquid, a sludge, gelatinous, dry and the like. It is only necessary that sufficient water be present in the waste to form a soluble silicate. If insufficient water is present, water can be added.

The biogenetic amorphous silica is added to the waste and there converted to soluble silicate by a strong alkali, and the soluble silicate then reacts with a polyvalent metal ion to harden and form a cementitious product with the waste. Advantageously, the biogenetic amorphous silica can be added to the waste at ambient temperatures and pressures to form the soluble silicate with the waste and the reaction of the soluble silicate with the polyvalent metal ion also occurs at ambient pressures and temperatures. There is no necessity to heat the waste to an initial reaction temperature. The hardened waste can either be removed or left in place, for example, to provide a land farm. In addition, the solidified and chemically fixed waste is valuable in that it can be broken up and used as a cover for land fills, land application and farms.

In some wastes, for example, those with high pH, that is, pH 12 and more, it is unnecessary to add a strong alkali, such as a sodium hydroxide solution. For low alkalinity waste, a strong alkali, either in solid or liquid form, can be added. If the waste does not contain calcium or other polyvalent metal ions, these can be added as one of several salts during processing or as an ingredient along with the biogenetic amorphous silica.

Virtually any combination of biogenetic silica, alkali, and source of polyvalent metal ion can be used. Any condition of high pH can be used, for example, waste sodium hydroxide solutions and other waste products with this characteristic. The most common alkalis which can be used are sodium hydroxide, potassium hydroxide, or soda ash.

Any source of polyvalent metal ion can be used. In some cases, the preferred source may be one with limited solubility in waste so that the metal ion is released slowly over a long period of time; and, in other cases, it is acceptable to have the metal ion entirely in solution when the mixture is made. The alkali and the polyvalent metal may be in either solid or liquid form.

The relative proportion of the ingredients to each other may vary from waste to waste.

A very simplified version of the basic chemistry involved in the process is as follows:

$$2NaOH + xSiO_2 \rightarrow Na_2O{:}x(SiO_2) + H_2O$$

$$Na_2O{:}x(SiO_2) + Ca(OH)_2 \rightarrow CaSi_xO_{2x+1} + 2NaOH$$

In place of calcium, any polyvalent metal species may be substituted, thence the formation of "fixed" toxic metals such as lead, chromium, mercury, etc. If present, these metals compete with the calcium for the silicate. The anion associated with the metal will help determine reaction rates, and also the final pH of the solid. For example, if the hydroxyl ion is dominant, sodium hydroxide will be continuously reformed to react again with the biogenetic (a strong alkali) silica, until eventually the silica is completely dissolved. On the other hand, if the metal is in the form of chloride or sulfate, such as $CaCl_2$, the reaction product will be more nearly neutral and the alkalinity will decrease until there is no longer sufficient hydroxyl ion to react with the silica. The final pH and other characteristics will then depend on the initial ratio of sodium hydroxide to silica. However, it must be realized that this is a very simplistic view of the processes taking place, since the soluble silicates formed are not exact stoichiometric compounds in any case. Also, the insoluble metal "silicates" that are formed may not be compounds at all, but solid solutions of other metal species in a hydrated silica matrix. There is evidence that the metal silica reaction occurs on the surface of the silicate particle. As a result, the newly-formed metal silicate is attached to the particle of biogenetic silica. Thus, a slurry of the material can be processed through a conventional phase separation device, a belt filter press, chamber press or centrifuge and the metal silicate will stay with the solid phase thus reducing the volume of material requiring disposal thereby saving money, conserving disposal resources and money is not lost for eons into disposal wells.

The present invention provides a new and useful application for biogenetic silicas, such as RHA. If the waste does not contain calcium (or other polyvalent metal ions), it can be added as one of several salts either during processing, or as an ingredient with the RHA. Another would be a system composed of RHA, a polyvalent metal compound, and a strong alkali (in either solid or liquid form) for the solidification of low-alkalinity waste which would normally be treated with a conventional cement/sodium silicate process. The RHA system would have certain advantages: slow, controlled setting with high ultimate strength; better mechanical properties when cured (due to higher solids content); immediate takeup of free water; easier mixing of viscous, sticky wastes. It also has better fixation properties for reasons discussed later.

The following are examples of amorphous biogenetic silica rice hull ash (RHA) in the in-situ formation of soluble silicates in chemical fixation/solidification treatment of wastes which illustrate the invention and some of its applications in practice.

EXAMPLE 1

A series of tests were made in which rice hull ash (RHA) was used at the normal addition rate to sorb water (5.3 lb/gal), and then 25% by volume of concentrated (50%) sodium hydroxide was added. One sample was allowed to cure with this mixture, while 0.84 lb/gal of calcium chloride was added to a second sample before it was cured. After 7 days, the sample with calcium chloride was hard (unconfined compressive strength (UCS=>4.5 tons/sq. ft.) while the other was unchanged UCS=~0.1 tons/sq. ft.). After 14 days, the sample with calcium chloride was even harder while the other sample was still unchanged. After five months, the sample without calcium ion still had not hardened, while the calcium containing sample was rock hard. Control samples with sodium chloride instead of calcium chloride and with calcium chloride but no sodium hydroxide, did not harden, proving that the chloride ion did not enter into the reaction, and that calcium chloride alone does not cause hardening. This example, taken with other evidence presented here, clearly demonstrates that the hardening reactions taking place are the result of formation of soluble silicates which then react very rapidly with polyvalent metal ions to form cementitious metal silicates.

EXAMPLE 2

During a treatability study on an actual calcium-based waste with high pH, it was noted that the addition of RHA alone produced a very hard product, rather than the usual loose granular material characteristic of this sorbent. The waste contained 3.7% calcium hydroxide, as well as other calcium compounds, 5.0% sodium hydroxide and 2.8% potassium hydroxide. At the addition rate of 1.5 lb/gal, the UCS value after 12 days curing was >4.5 tons/sq. ft. The addition of sodium silicate solution alone (0.9 lb/gal) resulted in a faster set, but no additional hardening with time. UCS values (tons/sq. ft.) for the sodium silicate solution was 1.7 at one day and 1.8 at 12 days while those for RHA were 0.0 and >4.5, respectively. This confirms the theory expressed above that the sodium silicate is formed slowly and reacts with polyvalent metal ions as it forms and that this controlled reaction produces a superior product.

EXAMPLE 3

Another treatability study was done on another waste, a biosludge from a BOD organic degrading unit at an organic chemical plant. This was a very difficult waste to solidify. It was gelatinous in nature, and was non-reactive with all of the usual CFS methods with the exception of the Portland/sodium silicate method. RHA and solidifying agents required large addition rates (4 lb/gal) to achieve even a weak solid (UCS=~1.0@11 days); kiln dust solidification required even larger addition rates (5 lb/gal). The Portland cement/sodium silicate method required less than 2 lb/gal addition of the reagents and yielded a harder solid (UCS=2.8@11 days). The addition of 0.67 lb/gal of RHA to the Portland cement/sodium silicate method yielded a very hard material (UCS=3.7@3 days, >>4.5 169 10 days) which could not be explained by the slightly increased solids content. It was explainable, however, based on the reaction of RHA with the high alkalinity produced by the sodium silicate solution.

EXAMPLE 4

The method of this invention was tried on the waste of Example 3 to determine if results similar to those using the Portland cement-sodium silicate process could be attained. Experiments with RHA 50% sodium hydroxide solution, and either calcium chloride or Portland cement in various proportions were carried out. The calcium chloride mixtures did not harden, but those with Portland cement as the source of calcium were very hard in 10 days (>4.5 tons/sq. ft.) at a total addition rate of 4 lb/gal (2 lb/gal enviroGuard, 1.3 lb/gal Portland cement, 0.67 lb/gal sodium hydroxide). It appears that, with this waste, the very soluble calcium chloride reacted rapidly with some component of the waste, possible sulfide ion, making it non-available for the silicate reaction. Cement, on the other hand, continuously produces calcium hydroxide as a result of its hydration reactions, so that calcium ion is always available for reaction with the soluble silicate as it is formed from the alkaline dissolution of RHA. Based on the above results, it was estimated that the method of this invention would require approximately the same total level of reagent addition as does the Portland cement-/sodium silicate method to achieve equivalent hardness.

EXAMPLE 5

In this example, waste material was a sludge from an organic chemical plant containing pyrolysis fuel oil, clarifier sludge and other mixed waste streams. Using the method of this invention, a mixture of 2.0 lb/gal RHA, 1.0 lb/gal Portland cement and 0.67 lb/gal sodium hydroxide (as 50% solution) was added to the waste. In 24 hours, a UCS=>>4.5 tons/sq. ft. was achieved using the above RHA-Portland cement-sodium hydroxide formula compared to UCS=2.1 (for the Portland cement/sodium silicate method at an addition rate of 2.1 lb/gal.) Again, approximately the same reagent addition levels would be required to achieve the same hardness in both methods. However, the Portland cement/sodium silicate additions yielded a viscous, sticky mass which was difficult to mix and compact while the method of this invention produced an easily mixed semi-solid which did not stick to equipment and was easily compacted.

EXAMPLE 6

In this example, the other biogenetic silicas previously set forth are used in place of RHA and similar results obtained.

Virtually any combination of biogenetic silica, alkali, and source of polyvalent metal ion can be used. Various forms of biogenetic silica other than RHA are discussed in U.S. Pat. No. 4,460,292. Any alkali or other source of hydroxyl ion sufficient to create a condition of high pH can be used, including waste products with this characteristic. The most common alkalies would be sodium hydroxide, potassium hydroxide and calcium oxide or hydroxide (lime). Any source of polyvalent metal ion has potential use. In some applications, such as in Example 4 above, the preferred source may be one with limited solubility in water, so that the metal ion is released slowly over a long time period. In other cases, it is acceptable to have the metal ion entirely in solution when the mixture is made. Portland cement and calcium chloride will work and other reactive species of polyvalent metals usable in specific situations. If the waste itself contains these species, so much the better. The alkali and the polyvalent metal may be in either solid or liquid form; the biogenetic silica is a solid.

In principle, any level of any ingredient could be used, so long as sufficient water is present to allow the reactions to occur. From a practical point of view, the following ranges would be feasible for total ingredients:

0.01 to 10.0 lb. per gallon of waste; or 0.5 to 400 lb. per ton of dry waste

The relative proportions of the ingredients to each other may vary from waste to waste, and also depending on the physical and chemical requirements of the resulting solid. This can be determined by simple experiments for the waste.

In practice, samples of the liquid waste are tested to determine the amounts of the alkali and polyvalent metal ions present as wastes differ in composition. Routine experiments on these samples are those run to determine optimum amounts of them as well as water to be added to the waste to solidify and chemically fix the wastes.

In summary, the following are some of the potential advantages of this invention over other CFS processes, especially where soluble silicate processes would be the method of choice: (1) controllable set-time, (2) better mechanical properties due to high solids content, (3) immediate solid formation due to the sorptive properties of biogenetic silica, such as RHA, (4) improved mixability of the ingredients with high viscosity, sticky wastes, (5) possible economic advantages, especially when the alkali and/or the setting agent (polyvalent metal ion) are present in the waste, (6) ability to use an all-solids reagent system, premixed if desired, (7) ability to use a variety of setting agents, (8) ability to control ultimate pH of solid, (9) fixation of metals, especially on a long-term basis, and (10) the reactions occur at ambient temperatures.

The present invention therefore is well suited and adapted to attain the objects and ends and has the advantages and features mentioned as well as others inherent therein.

While presently preferred examples and embodiments of the invention have been given for the purposes of disclosure, changes can be made therein which are within the spirit of the invention as defined by the scope of the appended claims.

What is claimed is:

1. A method of solidification and chemical fixation of a waste comprising:

adding to the waste at ambient-temperature and pressure biogenetic silica in the presence of a strong alkali on the order of about pH 12 and higher sufficient to form a soluble silicate with the biogenetic silica in the waste and sufficient water to form the soluble silicate, and in the presence of at least one polyvalent metal ion sufficient to form a cementitious product with the resulting soluble silicate effective to solidify and chemically fix the liquid waste and to allow said strong alkali to continuously reform to react with the biogenetic silica.

2. The method of claim 1 where, the biogenetic silica is rice hull ash.

3. The method of claim 2 where, the waste contains the strong alkali and the polyvalent metal ions sufficient to form the cementitious and chemically fixed product.

4. The method of claim 2 where, at least a portion of the strong alkali is added to the waste.

5. The method of claim 2 where, at least a portion of the polyvalent metal ions is added to the waste.

6. The method of claim 2 where, at least a portion of the strong alkali and polyvalent metal ions are added to the waste.

7. The method of claim 1 where, the waste is in a tank and biogenetic silica is added to the waste in the tank.

8. The method of claim 7 where, the biogenetic silica is rice hull ash.

9. The method of claim 7 where, the waste contains at least a portion of one of the polyvalent metal ions and the strong alkali.

10. The method of claim 7 where, at least a portion of the polyvalent metal ion and the strong alkali are added to the liquid waste.

11. The method of claim 1 where, the waste is in a tank and the waste is removed from the tank and the biogenetic silica is added to the removed waste.

12. The method of claim 11 where, the biogenetic silica is rice hull ash.

13. The method of claim 11 where, the waste contains at least a portion of one of the polyvalent metal ions and the strong alkali.

14. The method of claim 11 where, at least a portion of the polyvalent metal ion and the strong alkali are added to the liquid waste.

* * * * *

UNITED STATES PATENT AND TRADEMARK OFFICE
CERTIFICATE OF CORRECTION

PATENT NO. : 5,008,021

DATED : April 16, 1991

INVENTOR(S) : Jesse R. Conner, et al

It is certified that error appears in the above-identified patent and that said Letters Patent is hereby corrected as shown below:

Column 5, line 67, change "169" to --@--.

Signed and Sealed this

Twenty-second Day of December, 1992

Attest:

DOUGLAS B. COMER

Attesting Officer

Acting Commissioner of Patents and Trademarks